(12) United States Patent
Robert et al.

(10) Patent No.: US 11,466,736 B2
(45) Date of Patent: Oct. 11, 2022

(54) FREE-WHEEL PROVIDED WITH VARIABLE-OPENING LUBRICATION BARRIER

(71) Applicant: AIRBUS HELICOPTERS, Marignane (FR)

(72) Inventors: Sebastien Robert, Saint Cannat (FR); Adrien Escoffier, Septemes les Vallons (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 17/530,575

(22) Filed: Nov. 19, 2021

(65) Prior Publication Data
US 2022/0186792 A1 Jun. 16, 2022

(30) Foreign Application Priority Data
Dec. 10, 2020 (FR) ........................ 2012952

(51) Int. Cl.
*F16D 41/067* (2006.01)
*B64C 27/32* (2006.01)
(52) U.S. Cl.
CPC ............ *F16D 41/067* (2013.01); *B64C 27/32* (2013.01); *F16D 2300/06* (2013.01)
(58) Field of Classification Search
CPC .... F16D 41/067; F16D 41/066; F16D 41/064; F16D 41/06; F16D 2300/06
See application file for complete search history.

(56) References Cited

U.S. PATENT DOCUMENTS

| 4,995,490 A | * | 2/1991 | Kanai | ................... F16D 41/067 192/41 R |
| 2013/0199886 A1 | | 8/2013 | Heath et al. | |
| 2015/0204395 A1 | * | 7/2015 | Mori | ..................... F16D 41/067 192/45.008 |

FOREIGN PATENT DOCUMENTS

JP 2020051490 A 4/2020

OTHER PUBLICATIONS

French Search Report for French Application No. FR2012952, Completed by the French Patent Office, Dated Sep. 8, 2021, 8 pages.

* cited by examiner

*Primary Examiner* — Timothy Hannon
(74) *Attorney, Agent, or Firm* — Brooks Kushman P.C.

(57) ABSTRACT

A free-wheel comprising a driving part and a driven part that are able to rotate about an axis of rotation, the free-wheel comprising a cage carrying at least one rolling element arranged in a connection space, the free-wheel having at least one lubrication device conveying a lubricating fluid into the connection space. The free-wheel comprises at least one variable-opening barrier arranged radially between the driving part and the driven part and longitudinally against the connection space, the opening being indexed on a relative position of the cage and of the driving part.

16 Claims, 3 Drawing Sheets

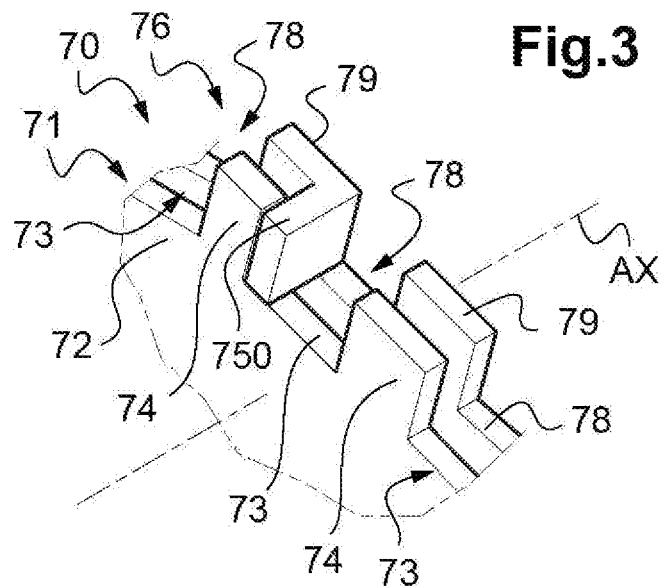
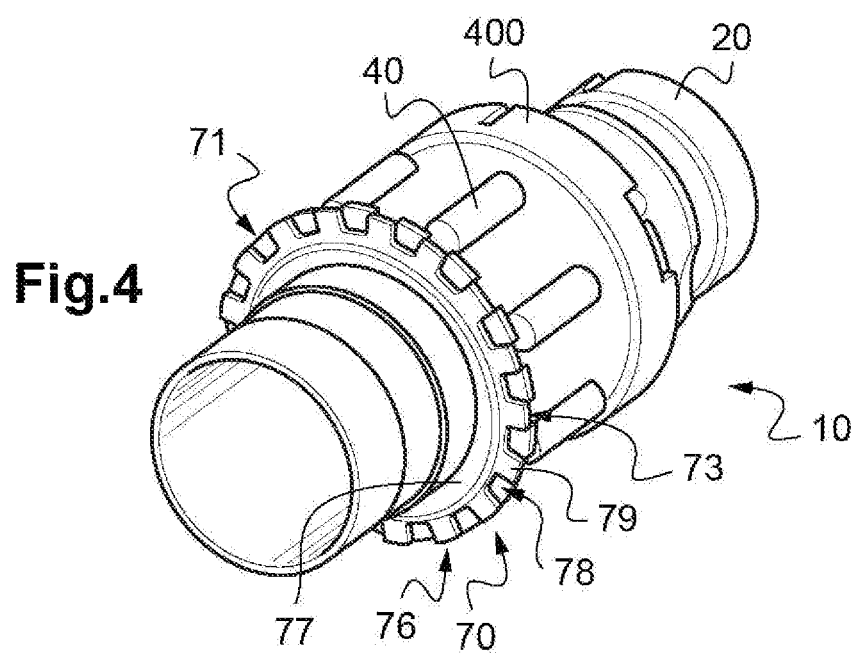

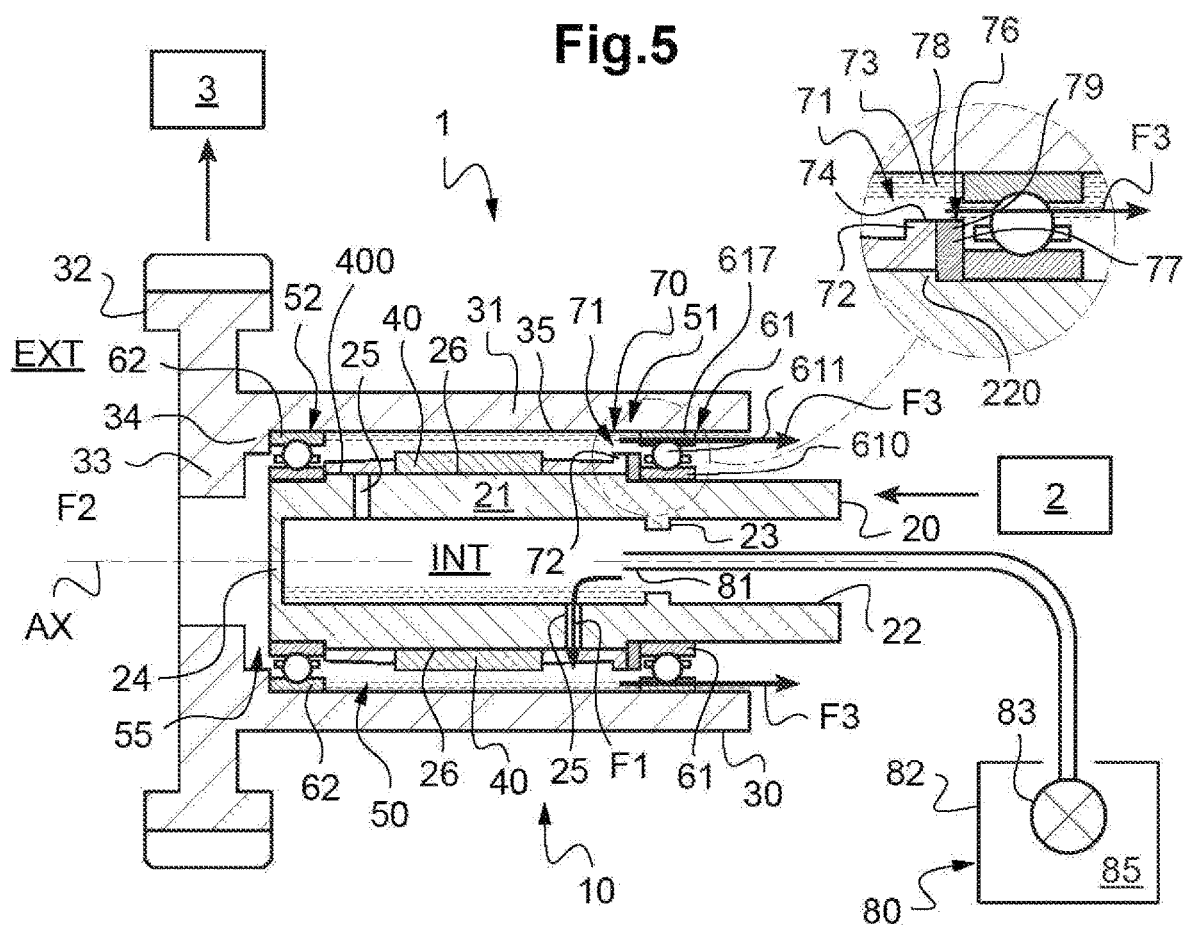
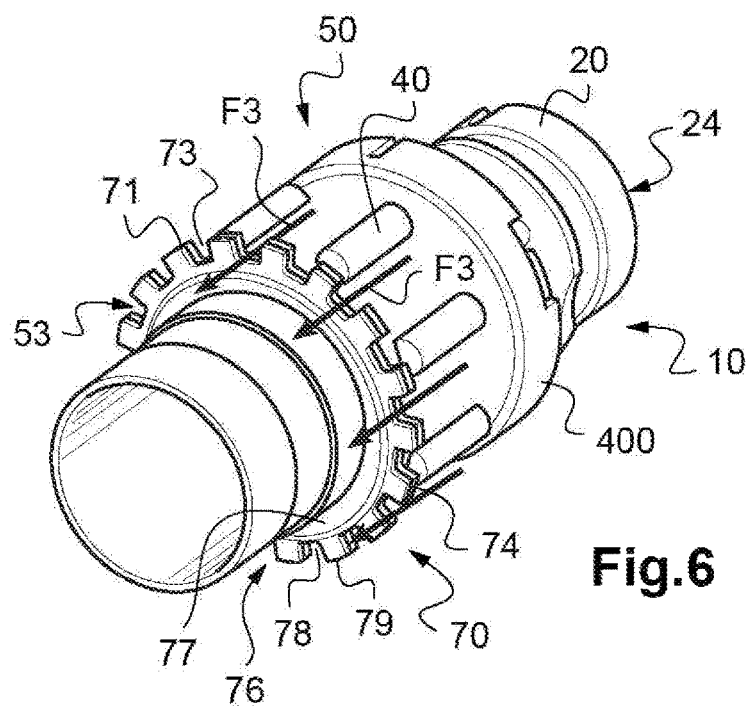

FREE-WHEEL PROVIDED WITH VARIABLE-OPENING LUBRICATION BARRIER

CROSS REFERENCE TO RELATED APPLICATIONS

This application claims priority to French patent application No. FR 20 12952 filed on Dec. 10, 2020, the disclosure of which is incorporated in its entirety by reference herein.

TECHNICAL FIELD

The present disclosure relates to a free-wheel provided with a variable-opening lubrication barrier. The disclosure therefore lies in the technical field of free-wheel lubrication.

BACKGROUND

A free-wheel is usually provided with a driving part, a driven part, and a rotational connection system for rotationally connecting the driving part and the driven part under particular conditions.

When stationary, or as long as the driven part is rotating faster than the driving part about an axis of rotation, the free-wheel is in an operating mode referred to, for convenience, as the "desynchronized" or "disengaged" operating mode. The driving part does not transmit engine torque to the driven part and vice versa. The driven part and the driving part are rotationally disengaged from each other about the axis of rotation. In this disengaged operating mode, the driven part and the driving part have a degree of freedom to rotate relative to each other about the axis of rotation.

Conversely, in an operating mode referred to as the "synchronized" or "engaged" operating mode, the driving part and the driven part rotate together at the same speed about the axis of rotation.

In order to switch from one operating mode to another, the free-wheel is provided with at least one connecting member interposed between the driving part and the driven part. The connecting member rotationally connects the driving part and the driven part in the engaged operating mode. In this engaged operating mode, the connecting member allows the above mentioned degree of rotational freedom between the driving part and the driven part to be eliminated.

According to one example, a free-wheel comprises a connecting member provided with at least one pawl.

According to one example, a roller free-wheel may comprise a first shaft having a peripheral portion provided with ramps. Conversely, a second shaft has a cylindrical face facing the ramps radially. Consequently, roller connecting members are carried by a cage and are arranged in the space radially separating the ramps and the cylindrical face. To either side of the rollers, the free-wheel may comprise two bearings, each bearing being interposed radially between the first shaft and the second shaft. During the disengaged operating mode, the rollers are each arranged at the foot of a ramp and do not connect the first shaft and the second shaft in rotation. When the switch is made to the synchronized operating mode, the rollers are moved towards the top of the ramps and temporarily wedged between the ramps and the cylindrical face. The first shaft and the second shaft become constrained to move together in rotation.

The first shaft may represent the driving part while the second shaft represents the driven part. The reverse is also possible.

Moreover, the first shaft may be an outer shaft that surrounds an inner shaft represented by the second shaft, or the second shaft may be an outer shaft that surrounds an inner shaft represented by the first shaft.

In a power plant of a rotorcraft, the driving part of a free-wheel may be connected to an engine, while the driven part of the free-wheel may be connected to a rotor. The free-wheel may be arranged within the engine, or within a gearbox or even within a kinematic linkage connecting an engine to the gearbox. For example, the gearbox may include one mechanical input system for transmitting torque for each engine, each mechanical input system for transmitting torque including a free-wheel. Each free-wheel can desynchronize an engine and the rotor, for example during starting or in the event of an engine failure.

Irrespective of its arrangement and nature, a free-wheel can be lubricated to optimize its service life. During the engaged operating mode, the free-wheel may need to be lubricated at the contact zones. These contact zones may in particular comprise, in a roller free-wheel, the rollers, the ramps, the cylindrical face and, if applicable, bearing members. During the disengaged operating mode, the free-wheel may heat up, for example due to the high-speed movement of any rollers. The lubrication system then aims to remove calories in order to cool the free-wheel.

According to a first known embodiment, the free-wheel is greased.

According to a second embodiment, the contact zones, in particular the rollers in the context of a roller free-wheel, are immersed in an oil bath. Immersing the connecting members of the free-wheel in oil is effective in limiting wear to this free-wheel during the engaged operating mode. Conversely, during the disengaged operating mode, the oil itself may be a source of heating due to a splashing effect.

A third known embodiment consists in spraying the contact zones with oil. For example, a jet conveys oil into the inner shaft. This inner shaft comprises at least one radial port for directing the oil between the driving part and the driven part by centrifugal effect, and therefore towards the contact zones of the free-wheel. The oil is then discharged out of the free-wheel by overflowing, passing through the two bearings arranged longitudinally to either side of the rollers, for example.

This third embodiment therefore allows a small quantity of lubricant to be circulated during the disengaged operating mode in order to remove calories from the free-wheel. However, the third embodiment does not allow de facto the contact zones to be immersed during the engaged operating mode.

To remedy this, the free-wheel may include at least one flange for defining a space that forms a "pool" of lubricant containing the rollers. The flange does not completely close a passage in fluid communication with the connection space. For example, a flange may be produced with a shouldered spacer or with a deflector integrated into one of said bearings. During the engaged operating mode, oil accumulates in this space before overflowing out of it over the flange. Determining the dimensions of the flange is a complex matter, as it requires the contact zones to be sufficiently immersed in oil during the engaged operating mode, while on the other hand preventing a splashing effect from occurring during the disengaged operating mode.

Document US 2013/199886 A1 describes a system provided with a housing. The housing accommodates two hubs and two roller assemblies. The system also includes a friction mechanism.

Document JP 2020 051490 A describes a free-wheel system provided with a lubrication device that has at least one seal.

SUMMARY

An object of the present disclosure is therefore to propose an alternative free-wheel that aims to be advantageous both during the engaged operating mode and during the disengaged operating mode.

The disclosure therefore relates to a free-wheel comprising a driving part and a driven part that are able to rotate about an axis of rotation, said free-wheel comprising a cage carrying at least one rolling element arranged in a connection space, said connection space being located radially, with respect to the axis of rotation, between a driving connection section of the driving part and a driven connection section of the driven part, said free-wheel comprising at least one lubrication device conveying a lubricating fluid into the connection space.

The free-wheel includes at least one variable-opening barrier disposed radially between the driving part and the driven part and longitudinally against the connection space, said opening being indexed to a relative position of said cage and the driving part.

The driving part thus transmits torque to the driven part during the engaged operating mode via the connecting member or members. Conversely, the driven part is able to rotate independently of the driving part in the disengaged operating mode. The connecting member or members then no longer connect the driving part and the driven part in rotation. In particular, in the disengaged operating mode, the driving part may be immobile facing the axis of rotation, whereas the driven part is, on the contrary, able to rotate about the axis of rotation. During the engaged operating mode, the driven part and the driving part may be able to rotate together about the axis of rotation.

The lubrication device may convey the lubricating fluid into the connection space both during the engaged operating mode and during the disengaged operating mode.

Consequently, the disclosure proposes a variable-opening barrier.

The term "opening" means a single channel enabling the barrier to be crossed or several channels enabling the barrier to be crossed. In other words, the opening has one or more channels that are at least partially closable.

The expression "said opening being indexed to a relative position of said cage and of the driving part" means that a flow area offered to the lubricating fluid present in the connection space is defined by the opening and varies as a function of a relative position of the cage with respect to the driving part. In the presence of several channels, the area of the flow area of the opening corresponds to the sum of the areas of the flow areas of the channels.

During the engaged operating mode, the rolling element or elements are disposed on a respective ramp or ramps of the driving part. The cage reaches de facto a first position relative to the driving portion. In this first position of the cage relative to the driving part, the total area of the opening is minimized, or even practically zero. The barrier represents a barrier with large dimensions seeking to maintain the lubricating fluid into the connection space. The lubricating fluid cannot pass through the barrier in order to escape from the connection space, with the exception of an optional leakage flow having a flow rate that is less than the flow rate entering the connection space, thus making it possible to completely drown the latter.

Conversely, during the disengaged operating mode, the rolling element or elements are located at the foot of a respective ramp or ramps. The cage reaches de facto a second position relative to the driving part. In this second position of the cage relative to the driving part, the total area of the opening highest in order to help discharge of the lubricating fluid out of the connection space. The lubricating fluid can escape from the connection space through the opening of the barrier.

The barrier therefore represents a lubrication barrier, with a variable flow area, cooperating with the driving part of the free-wheel and the cage.

The barrier therefore makes it possible to ensure lubrication substantially by immersing all the elements of the free-wheel present in the connection space in the engaged operating mode, and while limiting heating by lowering the level of lubricating fluid in the connection space during the disengaged operating mode.

The free-wheel may comprise one or more of the following additional features, taken individually or in combination.

According to one possibility, said barrier may comprise a first part that is fixed with respect to the driving part, said barrier comprising a second part integral with said cage, the first part comprising at least one first passage, the second part comprising at least one second passage that is longitudinally opposite to the first passage in a disengaged operating mode of the free wheel.

The barrier thus includes a first part and a second part able to rotate about the axis of rotation of the free-wheel, in order to place their respective passages either in opposite or staggered rows.

The second passage or passages are thus disposed in the extension of one or more respective first passages during the disengaged operating mode, which makes it possible to define an opening that brings the connection space in fluid communication with another environment via these passages.

Conversely, during the engaged operating mode, the second passage or passages are disposed in staggered rows with respect to the respective first passage or passages.

According to one possibility, the first part may include a first ring provided with said at least one first passage, and where appropriate with each first passage, said second part comprising a second ring provided with said at least one second passage, and where appropriate with each second passage.

This architecture enables the above-described operation to be obtained relatively easily.

According to one possibility, the first ring may be parallel to the second ring to facilitate this operation and the arrangement of the system.

According to a possibility compatible with the preceding possibility, the first ring and said second ring may be crenellated, said at least one first passage being disposed circumferentially between two first crenellations of the first ring, said at least one second passage being disposed circumferentially between two second crenellations of the second ring.

In the presence of a plurality of first passages, each first passage is circumferentially, i.e., in azimuth relative to the axis of rotation of the free-wheel, between two first distinct crenellations. Each first crenellation is therefore disposed circumferentially between two first passages. Likewise, in the presence of a plurality of second passages, each second passage is circumferentially, i.e., in azimuth relative to the axis of rotation of the free-wheel, between two second distinct crenellations. Each second crenellation is therefore disposed circumferentially between two second passages.

Circumferentially arranging a plurality of first passages and de facto a plurality of second passages has the advantage of discharging the lubricating fluid all around the axis of rotation. A bearing present, for example, behind the barrier in a direction of discharging the lubricating fluid is then well lubricated.

According to one possibility compatible with the preceding possibilities, at least one first crenellation may include an abutment that is able to rotate in a second passage of said at least one second passage.

The abutment makes it possible to position the cage optimally relative to the driving part.

According to one possibility compatible with the preceding possibilities, at least one second crenellation may comprise a protrusion able to rotate in a first passage of said at least one first passage.

The protrusion makes it possible to position the cage optimally relative to the driving part.

According to one possibility compatible with the preceding possibilities, the first part may be wedged longitudinally between a shoulder of the driving part and an inner race of a rolling bearing.

The first part is thus easily constrained to rotate with the driving part.

According to one possibility compatible with the preceding possibilities, said rolling element is able to cooperate with a ramp of the driving part and a cylindrical face of the driven part.

The free-wheel is then, for example, a roller free-wheel comprising several rollers carried by the cage.

According to one possibility compatible with the preceding possibilities, said free-wheel may have at least one inner bearing interposed in the connection space between the driving part and the driven part.

In this way, an inner bearing, for example a ball bearing, can also be lubricated.

According to one possibility compatible with the preceding possibilities, the connection space can extend longitudinally along the axis of rotation from a first side to a second side, said free-wheel comprising a single so-called barrier arranged longitudinally against the first side of the connection space, said free-wheel comprising an access that brings said second side into fluid communication with an external environment.

Therefore, the connection space is not completely closed, thus allowing the lubricating fluid in the connection space to be replenished.

The dimensions of the access and the lubrication device may be determined so as to maintain a desired level of lubricating fluid in the connection space during the engaged operating mode.

Alternatively, two barriers may be arranged longitudinally to either side of the connection space.

According to one possibility compatible with the preceding possibilities, a surrounded part of the driven part is surrounded at least partially by a not-surrounded part of the driving part or a surrounded part of the driving part is surrounded at least partially by a not-surrounded part of the driven part.

According to one possibility, the not-surrounded part may comprise an annular protuberance arranged opposite the second side, and a closed end arranged in the not-surrounded part, said access being disposed between said protuberance and said closed end.

This characteristic tends to optimize the access.

According to one possibility compatible with the preceding possibilities, the surrounded part may be hollow, said driving connection section comprising at least one channel bringing the connection space into fluid communication with an internal environment arranged in this surrounded part, said lubrication device comprising an injector injecting said lubricating fluid into said internal environment.

The term "injector" is to be interpreted in the broad sense and refers to a member allowing the lubricating fluid to be introduced into the internal environment. For example, the injector may include a jet, a simple pipe, etc.

According to one possibility compatible with the preceding possibilities, said surrounded part may comprise a flange that extends radially into the internal environment from a wall of this driving connecting section towards the axis of rotation, without reaching this axis of rotation, said internal environment extending longitudinally along the axis of rotation from said flange to a closed end of the surrounded part.

The purpose of the flange is to promote the supply of lubricating fluid to the connection space via the passage or passages.

In addition to a free-wheel, the disclosure also relates to a vehicle comprising this free-wheel.

For example, the vehicle may have an engine and a rotor helping the vehicle move, the driving part of the free-wheel being functionally connected to a shaft of the engine and said driven part of the free-wheel being connected to the rotor.

BRIEF DESCRIPTION OF THE DRAWINGS

The disclosure and its advantages appear in greater detail from the following description of examples given by way of illustration with reference to the accompanying figures, in which:

FIG. 3 is a view showing an example of a barrier provided with a protrusion;

FIG. 4 is a three-dimensional fragmentary section view of the FIG. 1 free-wheel;

FIG. 5 is a view showing a free-wheel according to the disclosure in the disengaged operating mode; and FIG. 6 is a three-dimensional fragmentary section view of the FIG. 5 free-wheel.

DETAILED DESCRIPTION

Elements present in more than one of the figures are given the same references in each of them.

Figure 1:
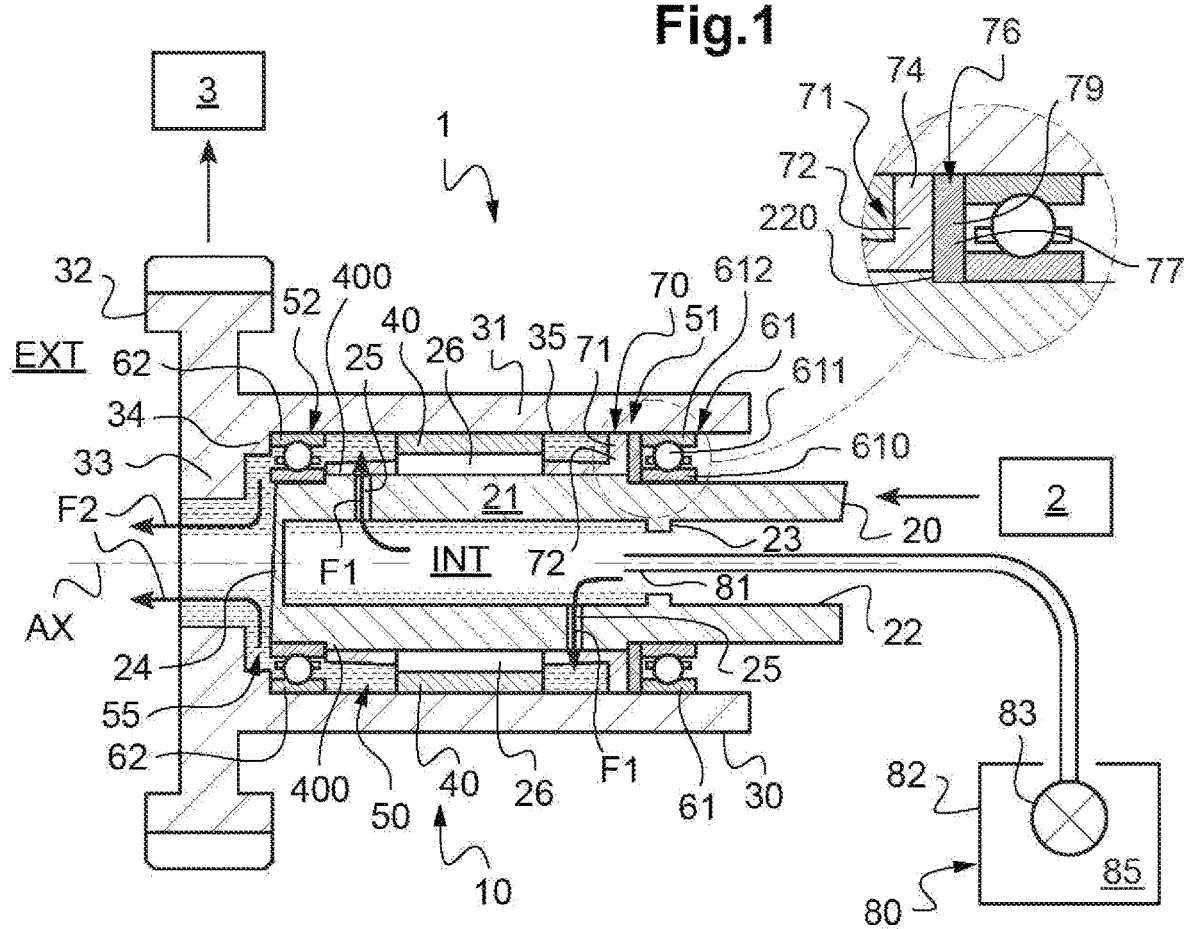
FIG. 1 is a view showing a free-wheel according to the disclosure in the engaged operating mode.

FIG. 1 shows a free-wheel 10 according to the disclosure.

The free-wheel 10 is provided with a driving part 20 and a driven part 30 that are each able to rotate about the same axis of rotation AX. The driving part 20 may be a one-piece component or may comprise several components secured together. The driven part 30 may be a one-piece component or may comprise several components secured together. At least one section of the driving part 20 or the driven part 30 may be symmetrical with respect to the axis of rotation AX.

The driving part 20 may be located radially at least partially between the axis of rotation AX and the driven part 30. The driving part 20 may therefore be surrounded by the driven part 30. In particular, a driven connection section 31 of the driven part 30 at least partially surrounds a driving connection section 21 of the driving part 20.

For example, the driving connection section 21 may be hollow. Optionally, the driving connection section 21 may extend up to an end 24 closed by a bottom, this end 24 being located in the driven part 30.

According to another variant compatible with the disclosure, the driven connection section 31 of the driven part 30 may be at least partially surrounded by the driving connection section 21 of the driving part 20.

Whatever the variant, one of the driving part 20 and the driven part 30 is referred to as the "surrounded part" for convenience and is surrounded locally by the other part referred to as the "not-surrounded part". According to the figures, the driving part 20 is the surrounded part, the driven part 30 being the not-surrounded part. The reverse is possible, the driving part 20 being then the not-surrounded part and the driven part 30 being the surrounded part. Irrespective of the relative position of the driving part 20 with respect to the driven part 30, the free-wheel 10 may be arranged within any type of architecture.

For example, the free-wheel 10 may be arranged within a vehicle 1. In particular, the free-wheel 10 may be arranged within a rotorcraft. According to one example, the driving part 20 may be connected by a kinematic linkage to an engine 2, while the driven part 30 may be connected by another kinematic linkage to a rotor 3.

Irrespective of its arrangement, the free-wheel 10 comprises at least one rotational connecting member 40 for connecting the driving part 20 and the driven part 30 in rotation about the axis of rotation AX during an engaged operating mode, and for rotationally disengaging the driving part 20 and the driven part 30 about the axis of rotation AX during a disengaged operating mode.

Irrespective of the number of rotational connecting members 40, each rotational connecting member 40 is arranged in a space referred to for convenience as a "connection space 50" on account of the role played by each rotational connecting member 40. This connection space 50 extends radially, i.e., relative to the axis of rotation AX, and therefore perpendicularly to this axis of rotation AX, between the driving part 20 and the driven part 30. In particular, the connection space 50 is arranged between the driving connection section 21 and the driven connection section 31.

For example, at least one or, if appropriate, each rotational connecting member may be in the form of a rolling element 40 arranged in a cage 400. Such a rolling element 40 may be a cylindrical roller, for example.

Therefore, the driving part 20 may comprise one ramp 26 for each rolling element 40. Each ramp 26 may have an inclined or curved face that is, for example, not tangent to a circle centered on the axis of rotation. Conversely, the driven part 30 may comprise a cylindrical face 35 arranged facing the ramps 26. Each rolling element 40 may then be free to move between a ramp 26 and the cylindrical face 35 during the disengaged operating mode and may be wedged between a ramp 26 and the cylindrical face 35 during the engaged operating mode.

Irrespective of the preceding characteristics, the free-wheel 10 may comprise at least one rotational guide bearing 61, 62, for example between the driving part 20 and the driven part 30. For example, a rotational guide bearing 61, 62 may be in the form of a ball bearing.

At least one bearing referred to for convenience "inner bearing 62" may be positioned in the connection space 50 and may extend radially from the driving part 20 to the driven part 30.

For example, the inner bearing may comprise two O-bearings arranged side by side.

A bearing referred to for convenience "rolling bearing 61" may be positioned out of the connection space 50. For example, the rolling bearing 61 comprises an inner race 610 fitted onto the surrounded part, the driving part 20 according to the example. The inner race 610 is surrounded by an outer race 612. Therefore, a plurality of rolling members 611 are each disposed between the inner race 610 and the outer race 612. Such rolling members may be balls, rollers, etc.

The inner bearing 62 may also be a bearing of this type.

In the example shown, a rolling bearing 61 is positioned longitudinally, i.e., along the axis of rotation AX, out of the connection space 50.

An inner guide bearing 62 is arranged into the connection space at a second side 52 of the connection space 50. Each rotational connecting member 40 is therefore arranged longitudinally between the rolling bearing 61 and the inner bearing 62.

Irrespective of the preceding features, the free-wheel 10 is provided with a lubrication device 80. This lubrication device 80 includes a lubricating fluid 85. For example, this lubricating fluid 85 comprises oil.

For example, this lubricating fluid 85 may be conveyed by an injector 81 into an internal environment INT delimited by the surrounded part, i.e., the driving part 20, shown in FIG. 1. According to the example shown, the lubrication device 80 may comprise a pump 83 arranged in a tank 82 containing the lubricating fluid 85. The pump 83 conveys the lubricating fluid 85 to the injector 81 via a fluid connection.

Irrespective of this aspect, the injector 81 injects the lubricating fluid into the internal environment INT. For example, the internal environment INT is delimited by the driving connection section 21. For example, the internal environment INT is closed longitudinally in one direction by the end 24.

Optionally, the surrounded part, and if appropriate the driving connection section 21 according to the illustration of the figures, comprises a flange 23 partially delimiting the internal environment INT. For example, this flange 23 is in the form of an inner annular protrusion that extends radially into the internal environment INT, from a cylindrical wall 22 of the driving part and towards the axis of rotation AX. Due to the centrifugal force exerted during use, such a flange 23 can, together with the end 24, contain the lubricating fluid 85 in the internal environment INT.

In order to transfer the lubricating fluid 85 into the connection space 50, the driving part may have at least one channel 25 bringing the internal environment INT and the connection space 50 into fluid communication. Each channel 25 can pass through the wall 22 completely or even radially. Optionally, two channels 25 open longitudinally to either side of the rotational connecting members 40, for example towards the cage 400. If required, the cage 400 may comprise bores capable of being in fluid communication with the channels and the connection space.

According to one possibility, at least one channel 25 may pass through a ramp 26 and open onto a rotational connection member 40.

Moreover, the free-wheel 10 comprises at least one barrier 70 arranged radially, in view of the axis of rotation AX, between the driving part 20 and the driven part 30. The barrier 70 is arranged longitudinally at one side of the connection space 50.

The opening of this barrier 70 varies as a function of the position of the cage 400 relative to the driving part 20, in order to close a fluid connection 53 present between the driving part 20 and the driven part 30 during the engaged operating mode.

The barrier 70 may comprise a first part 71 fixed relative to the driving part 20. For example, the first part 71 comprises a foot that is wedged longitudinally between a shoulder 220 of the driving part 20 and the inner race 610 of the rolling bearing 61. Optionally, the foot may comprise flutings cooperating with flutings of the driving part 20.

In addition, the barrier 70 may comprise a second part 76 secured to the cage 400.

For example, the cage 400 and the second part 76 are fixed to each other or form a one-piece component.

Figure 2:
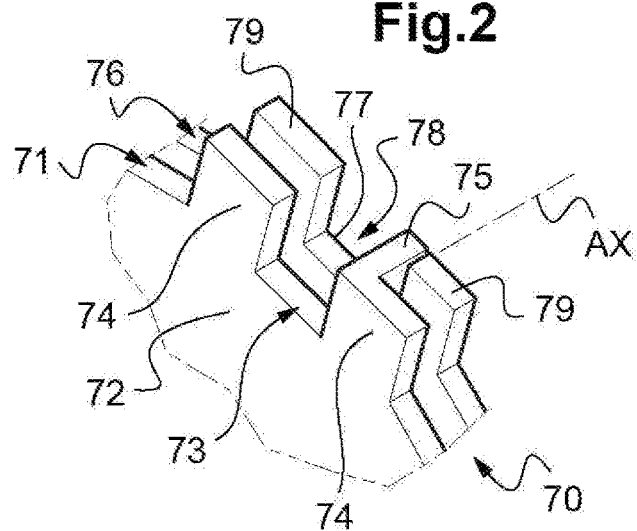
FIG. 2 is a view showing an example of a barrier provided with an abutment.

FIGS. 2 and 3 show two fragmentary views of two different barriers according to the disclosure.

With reference to FIG. 2, and whatever the embodiment, the first part 71 comprises at least one first passage 73, and a plurality of first passages 73 according to the examples illustrated. Likewise, the second part 76 comprises at least one second passage 78, and a plurality of second passages 78 according to the examples illustrated.

For example, the first part 71 comprises a first ring 72 provided with each first passage 73, each first passage is, for example, in the form of a cut-out or of a notch. Likewise, the second part 76 comprises a second ring 77 provided with each second passage 78, each second passage 78 is, for example, in the form of a cut-out.

For example, the first ring 72 and the second ring 77 are crenellated. Thus, the first ring 72 comprises on its periphery a plurality of first passages 73 each arranged circumferentially between two first crenellations 74. Likewise, the second ring 77 comprises on its periphery a plurality of second passages 78, each arranged circumferentially between two second crenellations 79 of the second ring 77.

In addition, or as an alternative, the first ring 72 and the second ring 77 may comprise respectively first passages 73 and second passages 78 between their centers and their peripheries.

In another aspect, the first ring 72 may be parallel to the second ring 77.

Independently of the manner of the various passages 73, 78 are made, each first passage 73 may be in alignment with a second passage 78, along an axis parallel to the axis of rotation AX, only during the disengaged operating mode. During the engaged operating mode, each first passage 73 is at least partially opposite a solid surface of the second part 76 and each second passage 78 is at least partially opposite a solid surface of the first part 71.

In another aspect, a first crenellation 74 may include an abutment 75 able to rotate within a second passage 78, and therefore relative to said second passage.

In addition, or as an alternative, and according to the example illustrated in FIG. 3, a second crenellation 79 may comprise a protrusion 750 able to rotate in a first passage 73, and therefore movable with respect to this first passage.

According to another aspect, and with reference to FIG. 1, the free-wheel 10 may, according to the example shown, comprise only one barrier 70. For example, this single barrier 70 is arranged at the first side 51 of the connection space 50. Consequently, the free-wheel 10 comprises an access 55 bringing the second side 52 into fluid communication with an external environment EXT situated outside the free-wheel 10.

For example, the not-surrounded part, i.e., the driven part 30, according to FIG. 1, comprises an annular protuberance 33 facing the second side 52. According to the example shown, the protuberance 33 is attached to an internal shoulder 34. This internal shoulder 34 can fasten the second bearing 62 longitudinally in synergy with the cage 400.

The access 55 can then be in the form of an annular groove arranged longitudinally between the protuberance 33 and the closed end 24 of the surrounded part, i.e., the driving part 20, according to FIG. 1, or indeed radially facing the internal shoulder 34.

The access 55 can be positioned in such a way as to help discharge the lubricating fluid through the passages 73 during the disengaged operating mode.

According to a variant not shown here, it is possible to consider, for example, having two barriers 70.

FIGS. 1 and 4 to 6 show the operation of the free-wheel 10.

According to FIG. 1, the free-wheel 10 is in the engaged operating mode.

The injector 81 conveys the lubricating fluid 85 into the internal environment INT. The lubricating fluid 85 passes through the channels 25 and penetrates into the connection space 50 in the direction shown by the arrow F1.

The rolling elements 40 are at the top of the ramps 26 and connect the driving part 20 and the driven part 30 in rotation.

Consequently, and with reference to FIG. 4, the first passages 73 do not face the second passages 78. The barrier 70 then tends to render the connection space 50 impervious at the second side 52.

With reference to FIG. 1, the barrier 70 closing the fluid connection 53 at the second side 52 of the connection space 50, the lubricating fluid 85 tends to accumulate in the connection space 50 and to immerse not only the rotational connecting member or members 40 but also any inner bearing or bearings 61, 62. The lubricating fluid 85 gradually overflows out of the connection space 50, in the direction shown by the arrows F2, via the access 55, and returns, for example, to the tank 82. In order to promote the pool effect, the protuberance 33 of the driven part 30 may extend longitudinally with respect the connection space 50. The size and position of the opening 55 can be determined such that the connection space 50 can be adequately immersed.

During the disengaged operating mode shown in FIG. 5, the driving part 20 can be stationary.

The rolling elements 40 are at the bottom of the ramps 26 and no longer connect the driving part 20 and the driven part 30 in rotation.

Consequently, and with reference to FIG. 6, the first passages 73 are facing the second passages 78. The barrier 70 then brings the connection space 50 in fluid communication with the external environment.

Consequently, the connection space 50 may then be partially emptied through the opening of the barrier 70, as created in this way according the arrows F3. The rotational connecting member or members 40, as well as any inner bearing or bearings 61, 62, are no longer immersed in the lubricating fluid 85. Conversely, the rolling bearing 61 is lubricated.

In particular, the lubricating fluid 85 may tend to accumulate against the cylindrical face 35, if necessary, between the bearings 61, 62, under the effect of the centrifugal force. According to the example shown, the lubricating fluid may extend between the outer races of the bearings 61, 62. If an access 55 is present, this access 55 can be positioned so as to be radially further from the cylindrical face 35 than the passages 78 so that the lubricating fluid 85 is discharged through these passages 78. As shown in FIG. 5, the rotational connecting members 40 and also the bearings 61, 62 are then not immersed in the lubricating fluid.

Naturally, the present disclosure may be subjected to numerous variations as to its implementation. Although several embodiments are described above, it should readily be understood that it is not conceivable to identify exhaustively all the possible embodiments. It is naturally possible to envisage replacing any of the means described by equivalent means without going beyond the ambit of the present disclosure.

What is claimed is:

1. A free-wheel comprising a driving part and a driven part that are able to rotate about an axis of rotation, the free-wheel comprising a cage carrying at least one rolling element arranged in a connection space, the connection space being located radially, with respect to the axis of rotation, between a driving connection section of the driving part and a driven connection section of the driven part, the free-wheel having at least one lubrication device conveying a lubricating fluid into the connection space,
   wherein the free-wheel comprises at least one variable-opening barrier arranged radially between the driving part and the driven part and longitudinally against the connection space, the opening being indexed on a relative position of the cage and of the driving part.

2. The free-wheel according to claim 1
   wherein the barrier comprises a first part fixed with respect to the driving part, the barrier comprising a second part secured with the cage, the first part comprising at least one first passage, the second part comprising at least one second passage longitudinally facing the first passage in a disengaged operating mode from the free-wheel.

3. The free-wheel according to claim 2
   wherein the first part comprises a first ring provided with the at least one first passage, the second part comprising a second ring provided with the at least one second passage.

4. The free-wheel according to claim 3
   wherein the first ring is parallel to the second ring.

5. The free-wheel according to claim 3
   wherein the first ring and the second ring are crenellated, the at least one first passage being disposed circumferentially between two first crenellations of the first ring, the at least one second passage being disposed circumferentially between two second crenellations of the second ring.

6. The free-wheel according to claim 5
   wherein at least one first crenellation comprises an abutment able to rotate in a second passage of the at least one second passage.

7. The free-wheel according to claim 5
   wherein at least one second crenellation includes a protrusion able to rotate in a first passage of the at least one first passage.

8. The free-wheel according to claim 2
   wherein the first part is wedged longitudinally between a shoulder of the driving part and an inner race of a rolling bearing.

9. The free-wheel according to claim 1
   wherein the rolling element cooperates with a ramp of the driving part and a cylindrical face of the driven part.

10. The free-wheel according to claim 1
    wherein the connection space extends longitudinally along the axis of rotation from a first side to a second side, the free-wheel comprising a single barrier arranged longitudinally against the first side of the connection space, the free-wheel comprising an access that brings the second side into fluid communication with an external environment.

11. The free-wheel according to claim 10
    wherein a surrounded part of the driven part is surrounded at least partially by a not-surrounded part of the driving part or a surrounded part of the driving part is surrounded at least partially by a not-surrounded part by the driven part, the not-surrounded part comprises an annular protuberance arranged opposite the second side and a closed end of the surrounded part, the access being arranged between the protuberance and the closed end.

12. The free-wheel according to claim 1
    wherein the free-wheel comprises at least one inner bearing interposed in the connection space between the driving part and the driven part.

13. The free-wheel according to claim 1
    wherein a surrounded part of the driven part is surrounded at least partially by a not-surrounded part of the driving part or a surrounded part of the driving part is surrounded at least partially by a not-surrounded part of the driven part, the surrounded part being hollow, and comprising at least one channel bringing the connection space in fluid communication with an internal environment arranged in this surrounded part, the lubrication device comprising an injector injecting the lubricating fluid into the internal environment.

14. The free-wheel according to claim 13
    wherein the surrounded part comprises a flange that extends radially into the internal environment towards the axis of rotation, without reaching this axis of rotation, the internal environment extending longitudinally along the axis of rotation from the flange to a closed end of the surrounded part.

15. A vehicle
    wherein the vehicle comprises the free-wheel according to claim 1.

16. The vehicle according to claim 15
    wherein the vehicle comprises an engine and a rotor helping the vehicle move, the driving part being functionally connected to a shaft of the engine and the driven part being connected to the rotor.

* * * * *